US012614811B2

(12) United States Patent (10) Patent No.: US 12,614,811 B2
Wakimoto et al. (45) Date of Patent: Apr. 28, 2026

(54) SECONDARY BATTERY

(71) Applicant: Prime Planet Energy & Solutions, Inc., Tokyo (JP)

(72) Inventors: Ryoichi Wakimoto, Kobe (JP); Hironori Marubayashi, Sumoto (JP); Akihiro Yoneyama, Kobe (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 683 days.

(21) Appl. No.: 17/707,966

(22) Filed: Mar. 30, 2022

(65) Prior Publication Data

US 2022/0320676 A1     Oct. 6, 2022

(30) Foreign Application Priority Data

Mar. 31, 2021     (JP) .................................. 2021-060900

(51) Int. Cl.
| | |
|---|---|
| *H01M 50/342* | (2021.01) |
| *H01M 50/103* | (2021.01) |
| *H01M 50/133* | (2021.01) |
| *H01M 50/15* | (2021.01) |
| *H01M 50/186* | (2021.01) |

(52) U.S. Cl.
CPC ..... *H01M 50/3425* (2021.01); *H01M 50/103* (2021.01); *H01M 50/133* (2021.01); *H01M 50/15* (2021.01); *H01M 50/186* (2021.01)

(58) Field of Classification Search
CPC ........... H01M 50/3425; H01M 50/103; H01M 50/133; H01M 50/15; H01M 50/186; H01M 50/169; H01M 50/176; H01M 50/184; H01M 50/30
See application file for complete search history.

(56) References Cited

U.S. PATENT DOCUMENTS

| | | | | |
|---|---|---|---|---|
| 6,929,880 B1* | 8/2005 | Mori | ...................... | B21D 22/28 |
| | | | | 429/176 |
| 2005/0112455 A1* | 5/2005 | Marubayashi | .... | H01M 50/3425 |
| | | | | 429/185 |

(Continued)

FOREIGN PATENT DOCUMENTS

| | | |
|---|---|---|
| CN | 109417134 A | 3/2019 |
| CN | 109891635 A | 6/2019 |

(Continued)

*Primary Examiner* — Barbara L Gilliam
*Assistant Examiner* — Joshua P McClure
(74) *Attorney, Agent, or Firm* — HAUPTMAN HAM, LLP

(57) ABSTRACT

According to the present disclosure, a secondary battery in which a gas discharge valve has excellent operational stability is provided. A battery case of the secondary battery disclosed herein includes a flat rectangular sealing plate, and a gas discharge valve provided in the sealing plate. In addition, in the secondary battery, a thickness T1 of the sealing plate, a length L1 of a short side of the sealing plate, a length L2 of a long side of the sealing plate, and a length L3 of the gas discharge valve in a short side direction satisfy expression (1) represented by $T1/L1 \leq 0.1$, expression (2) represented by $L2/L1 \geq 6$, and expression (3) represented by $L3/L1 \geq 0.4$. As a result, when an internal pressure of the case rises to a desired pressure, the sealing plate is easily bent and deformed, so that the gas discharge valve can be stably operated by the bending deformation.

12 Claims, 8 Drawing Sheets

14

(56)     References Cited

U.S. PATENT DOCUMENTS

| | | | | |
|---|---|---|---|---|
| 2009/0305128 A1* | 12/2009 | Yeo | .................... | H01M 50/105 |
| | | | | 429/174 |
| 2011/0212350 A1* | 9/2011 | Sato | ................. | H01M 50/3425 |
| | | | | 429/56 |
| 2011/0236734 A1* | 9/2011 | Ikeda | ............... | H01M 50/3425 |
| | | | | 137/511 |
| 2012/0114993 A1* | 5/2012 | Park | ................... | H01M 50/271 |
| | | | | 429/88 |
| 2014/0023890 A1* | 1/2014 | Okutani | ............... | H01M 50/30 |
| | | | | 72/352 |
| 2017/0033342 A1 | 2/2017 | Ueda et al. | | |
| 2018/0351139 A1* | 12/2018 | Muroya | ............. | H01M 50/103 |
| 2019/0237728 A1 | 8/2019 | Wakimoto et al. | | |
| 2019/0305287 A1* | 10/2019 | Matsui | ............... | H01M 50/512 |
| 2020/0052265 A1 | 2/2020 | Wakimoto et al. | | |
| 2020/0194759 A1* | 6/2020 | Shimada | ................. | H01G 9/12 |

FOREIGN PATENT DOCUMENTS

| | | | |
|---|---|---|---|
| EP | 4012826 | A1 | 6/2022 |
| EP | 4057428 | A1 | 9/2022 |
| JP | 2017168262 | A | 9/2017 |
| JP | 2020004650 | A | 1/2020 |
| WO | 2015156276 | A1 | 10/2015 |

* cited by examiner

SECONDARY BATTERY

CROSS REFERENCE TO RELATED APPLICATIONS

Priority is claimed on Japanese Patent Application No. 2021-060900, filed Mar. 31, 2021, the content of which is incorporated herein by reference.

BACKGROUND

1. Technical Field

The present disclosure relates to a secondary battery.

2. Description of the Related Art

A secondary battery such as a lithium ion secondary battery includes, for example, an electrode body, and a battery case for accommodating the electrode body. The battery case includes an exterior body that is a flat quadrangular container of which one surface side forms an opening portion, and a flat rectangular sealing plate that closes the opening portion of the exterior body. The battery case of the secondary battery of this type may be provided with a gas discharge valve to improve safety. The gas discharge valve is a secondary battery component designed to open at a preset desired pressure and discharge a gas inside the battery case when a large amount of gas is generated in the battery case.

For example, a sealing plate described in WO 2015/156276 is provided with a degassing valve (gas discharge valve) that releases a gas inside a case to the outside when a pressure inside the case reaches a reference pressure. This degassing valve has an easily breakable groove having a circular shape. This easily breakable groove has a first groove portion, a second groove portion, and a third groove portion, which have linear shapes. In addition, one end portions of each groove portion intersect each other at a center of the easily breakable groove. As a result, it is possible to inhibit variations in operating pressure of the degassing valve.

SUMMARY

Incidentally, in recent years, there has been an increasing demand for safety of a secondary battery, and thus it is required to improve operational stability of a degassing valve when it reaches a desired pressure. The technique disclosed herein has been made in view of such circumstances, and an object thereof is to provide a secondary battery with a degassing valve having excellent operational stability.

In order to achieve the object, the technique disclosed herein provides a secondary battery having the following configuration.

A secondary battery disclosed herein includes an electrode body including a positive electrode and a negative electrode, and a battery case configured to house the electrode body. The battery case of the secondary battery includes an exterior body that is a flat quadrangular container of which one surface side forms an opening portion, a flat rectangular sealing plate configured to close the opening portion of the exterior body, and a gas discharge valve provided in the sealing plate. In addition, in the secondary battery disclosed herein, a thickness T1 of the sealing plate, a length L1 of a short side of the sealing plate, a length L2 of a long side of the sealing plate, and a length L3 of the gas discharge valve in a short side direction of the sealing plate satisfy the following expressions (1) to (3).

$$T1/L1 \leq 0.1 \tag{1}$$

$$L2/L1 \geq 6 \tag{2}$$

$$L3/L1 \geq 0.4 \tag{3}$$

When an internal pressure of the battery case including the rectangular sealing plate rises significantly, the rectangular sealing plate is bent and deformed in a convex shape toward the outside of the battery case. The secondary battery having the above configuration is made on the basis of the idea of using stress due to the bending deformation of the sealing plate for an operation of the gas discharge valve. Specifically, in a case in which a ratio (T1/L1) of the thickness T1 of the sealing plate to the length L1 of the short side of the sealing plate is set to a certain value or less to lower a strength of the sealing plate as shown in the above expression (1), the bending deformation of the sealing plate is likely to occur. Also, in a case in which the ratio (L2/L1) of the length L2 of the long side of the sealing plate to the length L1 of the short side of the sealing plate is set to a certain value or more to increase a bending moment near a center of the sealing plate in a long side direction thereof as shown in the expression (2), the bending deformation of the sealing plate is more likely to occur. In addition, in a case in which the ratio (L3/L1) of the length L3 in the short side direction of the gas discharge valve to the length L1 of the short side of the sealing plate is set to a certain value or more as shown in the expression (3), the operation (opening) of the gas discharge valve becomes easier due to the stress generated from the bending deformation of the sealing plate. For this reason, according to the secondary battery disclosed herein, the gas discharge valve can be stably operated when the internal pressure of the case reaches a desired pressure.

Also, in a preferred embodiment of the secondary battery disclosed herein, the sealing plate is fitted into the opening portion of the exterior body, and a welded portion is formed to bridge between an upper surface of the exterior body forming an outer edge of the opening portion and an outer surface of the sealing plate. As a result, the exterior body and the sealing plate can be joined with sufficient strength.

In a preferred embodiment of the secondary battery disclosed herein, a heat insulating groove extending in the long side direction of the sealing plate is formed between the long side of the sealing plate and the gas discharge valve. Thus, it is possible to inhibit transfer of heat to the gas discharge valve when the long side of the sealing plate and the exterior body are welded. As a result, malfunction due to thermal fatigue of the gas discharge valve can be appropriately prevented. Further, the sealing plate on which the heat insulating groove is formed tends to be bent and deformed when the internal pressure of the case rises significantly. For this reason, it can also contribute to improvement of operational stability of the gas discharge valve.

In a preferred embodiment of the secondary battery disclosed herein, a plurality of the electrode bodies are housed inside the battery case. Thus, timing of gas generation can be dispersed for each electrode body, and the internal pressure of the battery case can be gradually increased. As a result, the gas discharge valve can be operated to discharge the gas before the internal pressure of the battery case rises to a very high region.

In a preferred embodiment of the secondary battery disclosed herein, a pair of electrode terminals configured to penetrate the sealing plate are provided, two terminal insertion holes into which each of the pair of electrode terminals is inserted are formed in the sealing plate, and the length L1 of the short side of the sealing plate and the shortest distance L4 from the gas discharge valve to the terminal insertion holes in the long side direction of the sealing plate satisfy the following expression (4). According to such a configuration, current collecting terminals inserted into the terminal insertion holes can prevent the bending deformation of the sealing plate in the vicinity of the gas discharge valve from being hindered.

$$L4/L1 \geq 3 \tag{4}$$

In a preferred embodiment of the secondary battery disclosed herein, a liquid injection hole configured to communicate with an internal space of the exterior body is formed in the sealing plate, the liquid injection hole is sealed by a sealing member, and the length L1 of the short side of the sealing plate and a distance L5 from the gas discharge valve to the liquid injection hole in the long side direction of the sealing plate satisfy the following expression (5). According to such a configuration, the sealing member of the liquid injection hole can prevent the bending deformation of the sealing plate in the vicinity of the gas discharge valve from being hindered.

$$L5/L1 \geq 1 \tag{5}$$

In a preferred embodiment of the secondary battery disclosed herein, a pair of electrode terminals configured to penetrate the sealing plate, an external conductive member connected to the electrode terminals outside the sealing plate, and an external insulating member interposed between the outer surface of the sealing plate and the external conductive member are provided, and the length L1 of the short side of the sealing plate and the shortest distance L6 from the gas discharge valve to the external insulating member in the long side direction of the sealing plate satisfy the following expression (6). According to such a configuration, the external insulating member can prevent the bending deformation of the sealing plate in the vicinity of the gas discharge valve from being hindered.

$$L6/L1 \geq 2 \tag{6}$$

In a preferred embodiment of the secondary battery disclosed herein, the exterior body includes a pair of first side walls joined to each of the short sides of the sealing plate, and a pair of second side walls joined to each of the long sides of the sealing plate, and a thickness of the first side wall is larger than a thickness of the second side wall. As a result, when the internal pressure of the case rises significantly, it is possible to prevent the first side wall of the exterior body from being deformed before the sealing plate, and more appropriately prevent occurrence of the bending deformation of the sealing plate.

In a preferred embodiment of the secondary battery disclosed herein, the sealing plate is fitted into the opening portion of the exterior body, the welded portion is formed to straddle between the upper surface of the exterior body forming the outer edge of the opening portion and the outer surface of the sealing plate, and a depth of the welded portion straddling between the long side of the sealing plate and the second side wall is larger than a depth of the welded portion straddling between the short side of the sealing plate and the first side wall. As a result, it is possible to prevent the welded portion on the long side of the sealing plate from peeling off and the bending deformation of the sealing plate from being hindered.

In a preferred embodiment of the secondary battery disclosed herein, the length L3 of the gas discharge valve in the short side direction of the sealing plate and a length L7 of the gas discharge valve in the long side direction of the sealing plate satisfy the following expression (7). As a result, the gas discharge valve can be stably operated when the sealing plate is bent and deformed.

$$0.8 \leq L3/L7 \leq 2 \tag{7}$$

In a preferred embodiment of the secondary battery disclosed herein, the gas discharge valve includes a central portion, a peripheral portion formed around the central portion, and an annular breakable groove formed to surround the central portion at the peripheral portion, and a geometrical moment of inertia of the central portion is larger than a geometrical moment of inertia of the peripheral portion. As a result, the gas discharge valve opens starting from the peripheral portion in which the geometrical moment of inertia is relatively low, and thus the operational stability of the gas discharge valve can be further improved.

In a preferred embodiment of the secondary battery disclosed herein, a bottom surface of the gas discharge valve protrudes from an inner surface of the sealing plate toward the electrode body, an internal insulating member is disposed between the sealing plate and the electrode body, and a distance from the bottom surface of the gas discharge valve to the electrode body in a direction perpendicular to the sealing plate is larger than a thickness of the internal insulating member. As a result, it is possible to prevent contact between the gas discharge valve and the electrode body, and inhibit breakage of the gas discharge valve, conduction between the battery case and the electrode body, or the like.

In a preferred embodiment of the secondary battery disclosed herein, the bottom surface of the gas discharge valve protrudes from the inner surface of the sealing plate toward the electrode body, the liquid injection hole configured to communicate with the internal space of the exterior body is formed in the sealing plate, the sealing member configured to seal the liquid injection hole protrudes from the inner surface of the sealing plate toward the electrode body, and in the direction perpendicular to the sealing plate, the distance from the bottom surface of the gas discharge valve to the electrode body is larger than a distance from the sealing member to the electrode body. As a result, it is possible to prevent the contact between the gas discharge valve and the electrode body, and inhibit the breakage of the gas discharge valve.

In a preferred embodiment of the secondary battery disclosed herein, the length L1 of the short side of the sealing plate is 30 mm or more. In a large secondary battery of this type, it is relatively difficult to operate the gas discharge valve stably. However, according to the technique disclosed herein, even in such a large secondary battery, a gas discharge valve having excellent operation stability can be easily formed.

DETAILED DESCRIPTION

Some preferred embodiments of the technique disclosed herein will be described below with reference to the figures. Further, matters other than those specifically mentioned in the present specification and necessary for implementing the present technique (for example, general configurations and manufacturing processes of a secondary battery, which do not characterize the present disclosure) may be understood as design matters by those skilled in the art based on conventional techniques in the art. The present disclosure can be implemented on the basis of the content disclosed in the present specification and common technical knowledge in the art. Also, in the present specification, the notation "A to B" indicating a range includes meanings of A or more and B or less as well as "preferably larger than A" and "preferably smaller than B."

In addition, in the present specification, "secondary batteries" is a term indicating general power storage devices capable of repeating charging and discharging, and the concept includes so-called storage batteries (chemical batteries) such as lithium ion secondary batteries or nickel hydrogen batteries, and capacitors (physical batteries) such as electrical double layer capacitors.

Outline of Configuration of Secondary Battery

Figure 1:
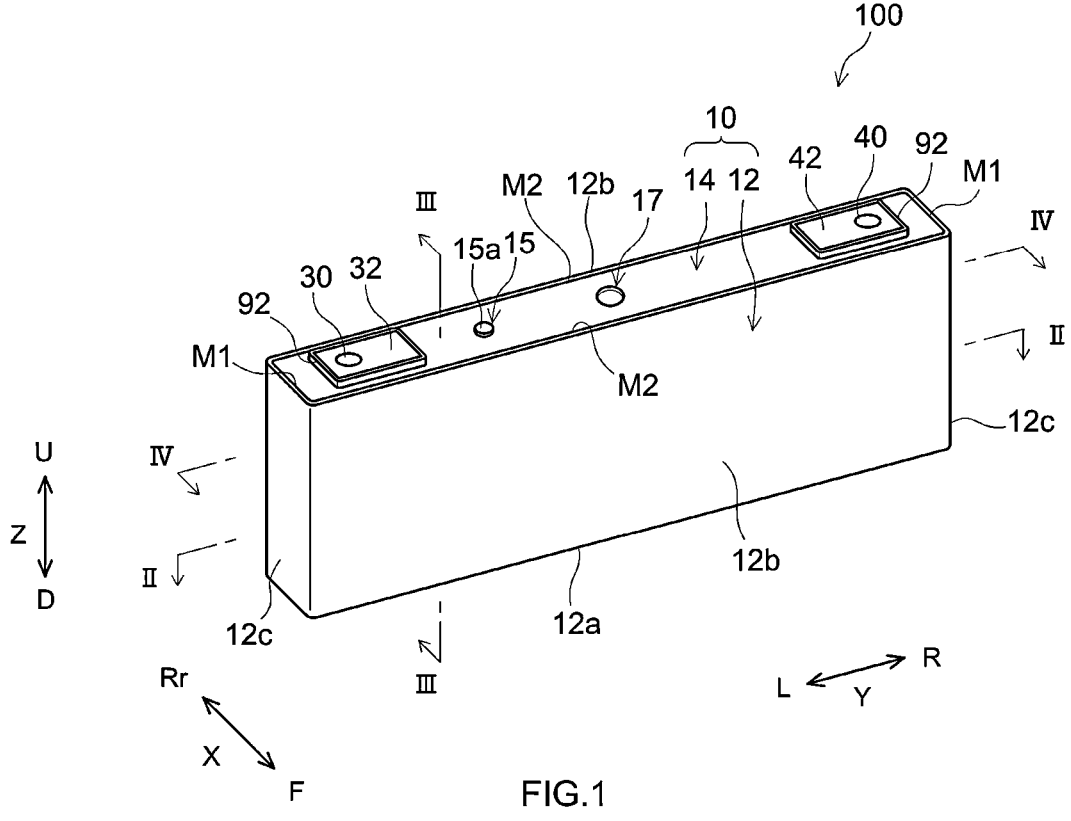
FIG. 1 is a perspective view schematically showing a secondary battery according to an embodiment.
Figure 2:
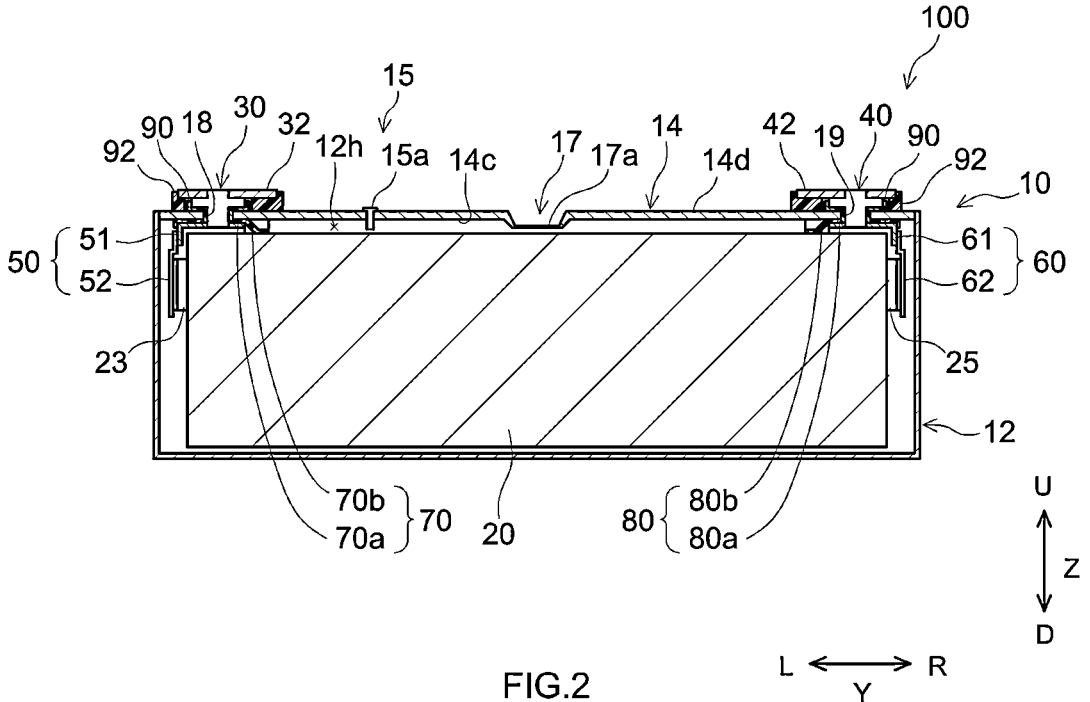
FIG. 2 is a schematic vertical cross-sectional view along line II-II in FIG. 1.
Figure 3:
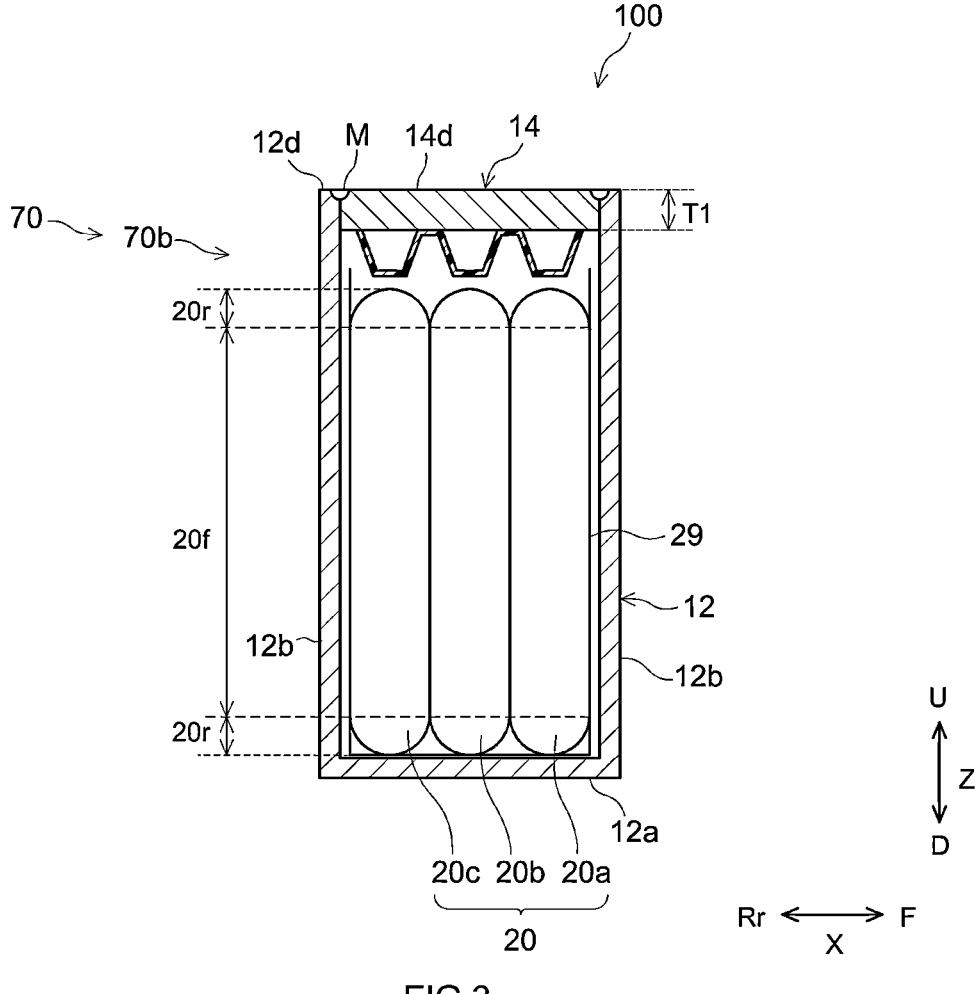
FIG. 3 is a schematic vertical cross-sectional view along line III-III in FIG. 1.
Figure 4:
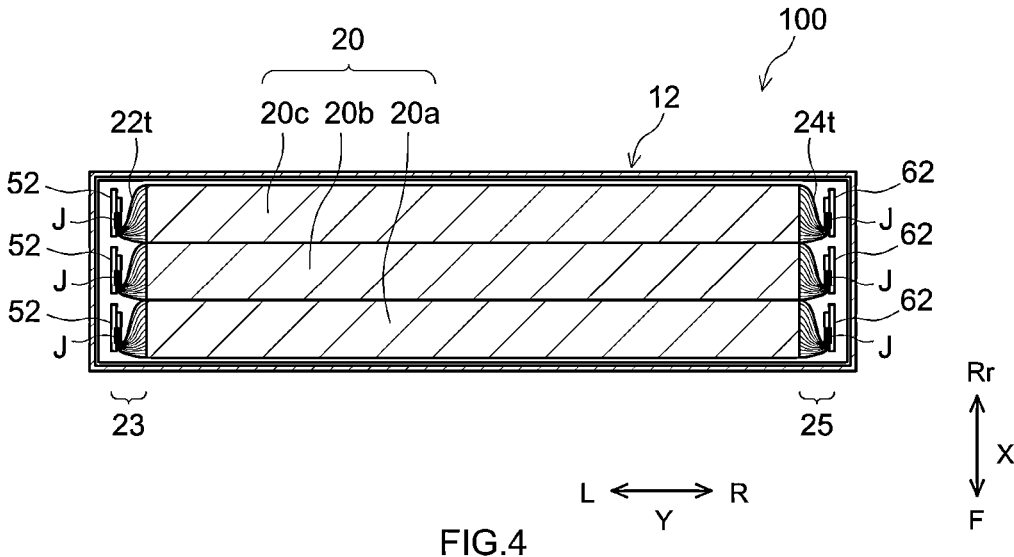
FIG. 4 is a schematic cross-sectional view along line IV-IV in FIG. 1.

FIG. 1 is a perspective view of a secondary battery 100. FIG. 2 is a schematic vertical cross-sectional view along line II-II in FIG. 1. FIG. 3 is a schematic vertical cross-sectional view along line III-III in FIG. 1. FIG. 4 is a schematic cross-sectional view along line IV-IV in FIG. 1. In the following description, reference numeral L in the figures represents left, and reference numeral R represents right. Also, reference numeral F represents front, and reference numeral Rr represents rear. In addition, reference numeral U represents upward, and reference numeral D represents downward. Further, reference numeral X in the figures represents a short side direction of the secondary battery 100. Reference numeral Y represents a long side direction orthogonal to the short side direction. Moreover, reference numeral Z represents a vertical direction. However, these are merely directions for convenience of explanation and do not limit an installation form of the secondary battery 100 at all.

As shown in FIG. 2, the secondary battery 100 includes a battery case 10 and an electrode body 20. Also, the secondary battery 100 according to the present embodiment includes, in addition to the battery case 10 and the electrode body 20, a positive electrode terminal 30, a positive electrode external conductive member 32, a negative electrode terminal 40, a negative electrode external conductive member 42, an external insulating member 92, a positive electrode current collecting unit 50, a negative electrode current collecting unit 60, a positive electrode internal insulating member 70, and a negative electrode internal insulating member 80. In addition, although not shown, the secondary battery 100 according to the present embodiment further includes an electrolytic solution. The secondary battery 100 is a lithium ion secondary battery here. Internal resistance of the secondary battery 100 can be, for example, about 0.2 to 2.0 mΩ.

The battery case 10 is a housing for housing the electrode body 20. The battery case 10 has a flat and bottomed rectangular parallelepiped outer shape here. A material of the battery case 10 may be the same as a conventionally used one, and is not particularly limited. The battery case 10 is preferably made of a metal having a predetermined strength. Specifically, a tensile strength of the metal used in the battery case 10 is appropriately about 50 $N/mm^2$ to 200 $N/mm^2$. A physical property value (rigidity) of the metal used in the battery case 10 is preferably about 20 GPa to 100 GPa. As an example of the metal material of this type, aluminum, aluminum alloys, iron, iron alloys, or the like can be exemplified.

In addition, the battery case 10 includes an exterior body 12, a sealing plate 14, and a gas discharge valve 17. The exterior body 12 is a flat quadrangular container of which one surface side forms an opening portion 12h. Specifically, as shown in FIG. 1, the exterior body 12 includes a substantially rectangular bottom wall 12a, a pair of first side walls 12c that extend upward U from short sides of the bottom wall 12a and face each other, and a pair of second side walls 12b that extend upward U from long sides of the bottom wall 12a and face each other. An area of the first side wall 12c is smaller than an area of the second side wall 12b. Further, the opening portion 12h is formed on an upper surface of the exterior body 12 surrounded by the pair of first side walls 12c and the pair of second side walls 12b. The sealing plate 14 is attached to the exterior body 12 to close the opening portion 12h of the exterior body 12. The sealing plate 14 is a plate material having a substantially rectangular shape in a plan view. The sealing plate 14 faces the bottom wall 12a of the exterior body 12. The battery case 10 is formed by joining (for example, welding) the sealing plate 14 to a peripheral edge of the opening portion 12h of the exterior body 12. The sealing plate 14 can be joined by welding such as laser welding. Specifically, the pair of first side walls 12c are each joined to short sides 14a (see FIG. 8) of the sealing plate 14. Also, the pair of second side walls 12b are each joined to long sides 14b (see FIG. 8) of the sealing plate 14. In this case, as shown in FIG. 3, the exterior body 12 and the sealing plate 14 are preferably welded together such that a welded portion M is formed to straddle between an upper surface 12d of the exterior body 12 forming an outer edge of the opening portion 12h and an outer surface 14d of the sealing plate 14. As a result, the exterior body 12 and the sealing plate 14 can be joined with sufficient strength.

As shown in FIGS. 1 and 2, the gas discharge valve 17 is formed on the sealing plate 14. The gas discharge valve 17 is configured such that it opens when a pressure in the battery case 10 is equal to or greater than a predetermined value and discharges a gas in the battery case 10. The gas discharge valve 17 according to the present embodiment is a substantially circular recessed portion in a plan view, which is recessed from the outer surface 14d of the sealing plate 14 toward the electrode body 20 side. A thinned portion 17*a* thinner than a thickness T1 (see FIG. 3) of the sealing plate 14 is formed on a bottom surface of the gas discharge valve 17. The thinned portion 17*a* of the gas discharge valve 17 breaks when an internal pressure of the case is equal to or greater than a predetermined value. As a result, the gas inside the battery case 10 can be discharged to the outside, and an increased internal pressure of the case can be reduced. Further, although not particularly limited, a thickness of the thinned portion 17*a* is preferably 0.1 mm to 0.5 mm, more preferably 0.2 mm to 0.4 mm, and can be, for example, about 0.3 mm. As the thinned portion 17*a* becomes thinner, reactivity (easiness of breaking the thinned portion 17*a*) of the gas discharge valve 17 with respect to an increase in the internal pressure of the case improves. On the other hand, as the thinned portion 17*a* becomes thicker, a strength of the thinned portion 17*a* improves, so that malfunction of the gas discharge valve 17 can be inhibited.

Figure 8:
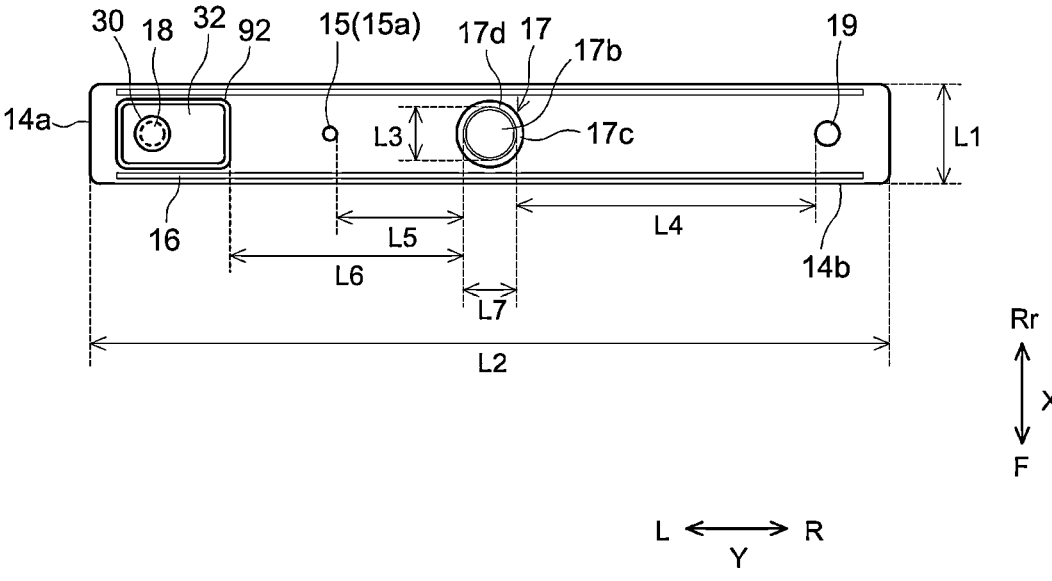
FIG. 8 is a plan view schematically showing the sealing plate of the secondary battery according to the embodiment.

As shown in FIG. 8, the bottom surface (thinned portion 17*a* in FIG. 2) of the gas discharge valve 17 according to the present embodiment includes a central portion 17*b*, which has a substantially circular shape in a plan view, a peripheral edge portion 17*c* formed around the central portion 17*b*, and an annular breakable groove 17*d* formed in the peripheral edge portion 17*c* to surround the central portion 17*b*. Thus, a geometrical moment of inertia of the central portion 17*b* becomes larger than a geometrical moment of inertia of the peripheral edge portion 17*c*. As a result, the thinned portion 17*a* can be broken starting from the peripheral edge portion 17*c*. In other words, by forming the annular breakable groove 17*d* in the thinned portion 17*a* of the gas discharge valve 17, a breaking start position at the time of operating the gas discharge valve 17 is controlled, and thus operation stability of the gas discharge valve 17 can be improved. For example, the thickness of the thinned portion 17*a* (a residual wall portion) in which the breakable groove 17*d* is formed can be set to, preferably 0.05 mm to 0.3 mm, more preferably 0.05 mm to 0.2 mm, and for example, about 0.1 mm. As the residual wall portion becomes thinner (the breakable groove 17*d* becomes deeper), breaking is more likely to occur starting from the breakable groove 17*d*, and the reactivity of the gas discharge valve 17 tends to improve. On the other hand, as the residual wall portion becomes thicker (the breakable groove 17*d* becomes shallower), the malfunction of the gas discharge valve 17 can inhibited.

Also, the gas discharge valve 17 is preferably formed in a central region of the sealing plate 14 in the long side direction Y. Thus, stress resulting from bending deformation of the sealing plate 14 is efficiently applied to the gas discharge valve 17, and thus the operational stability of the gas discharge valve 17 can be appropriately improved. In addition, in the present specification, "central region of the sealing plate" indicates a region including a center point of the sealing plate in the long side direction. That is, in a case in which a formation region of the gas discharge valve in a plan view includes the center point of the sealing plate, it can be said that "the gas discharge valve is formed in the central region of the sealing plate". Further, in the secondary battery disclosed herein, the gas discharge valve does not necessarily have to be formed in the central region of the sealing plate. As will be described in detail later, depending on the mounting positions of various parts (electrode terminals, sealing members, external insulating members, etc.) mounted on the sealing plate, a position at which the bending deformation of the sealing plate occurs may deviate from the central region of the sealing plate. For this reason, in the technique disclosed herein, it is preferable that a preliminary test or the like be performed to identify the position at which the bending deformation of the sealing plate occurs, and then the position at which the bending deformation of the sealing plate occurs be included in the formation region of the gas discharge valve. As a result, the stress resulting from bending deformation of the sealing plate is efficiently applied to the gas discharge valve, and thus the operational stability of the gas discharge valve can be appropriately improved.

Further, in addition to the gas discharge valve 17, the sealing plate 14 is provided with a liquid injection hole 15 and two terminal insertion holes 18 and 19. The liquid injection hole 15 communicates with an internal space of the exterior body 12, and is an opening provided for injecting an electrolytic solution in a manufacturing process of the secondary battery 100. The liquid injection hole 15 is sealed by a sealing member 15*a*. As such a sealing member 15*a*, for example, a blind rivet is suitable. Thus, the sealing member 15*a* can be firmly fixed inside the battery case 10. Also, a diameter of the liquid injection hole 15 is preferably 2 mm to 5 mm, more preferably 3 mm to 4 mm, and can be, for example, about 3.2 mm. In addition, the terminal insertion holes 18 and 19 are formed at both end portions of the sealing plate 14 in the long side direction Y. The terminal insertion holes 18 and 19 penetrate the sealing plate 14 in the vertical direction Z. As shown in FIG. 2, the positive electrode terminal 30 is inserted into the terminal insertion hole 18 on one side (the left side) of the long side direction Y. Further, the negative electrode terminal 40 is inserted into the terminal insertion hole 19 on the other side (the right side) in the long side direction Y. Also, a diameter of each of the terminal insertion holes 18 and 19 is preferably 10 mm to 20 mm, more preferably 13 mm to 18 mm, and can be, for example, about 16 mm.

Figure 5:
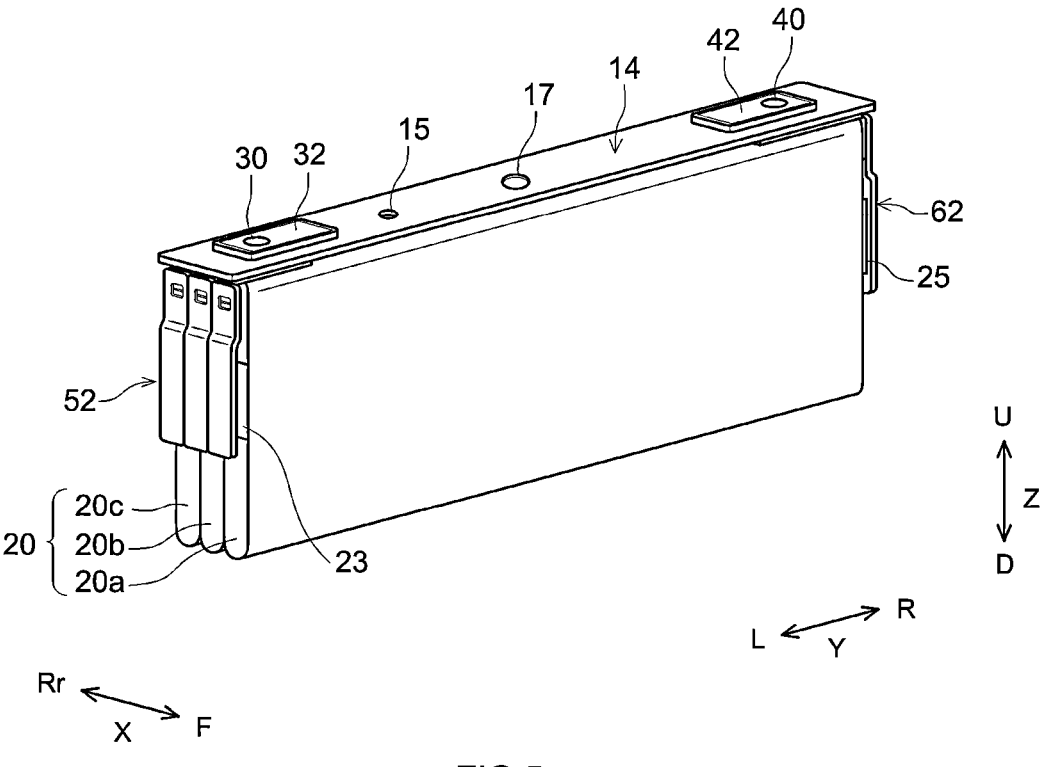
FIG. 5 is a perspective view schematically showing an electrode body group attached to a sealing plate.

FIG. 5 is a perspective view schematically showing electrode bodies 20 attached to the sealing plate 14. In the present embodiment, a plurality of (three in this case) electrode bodies 20*a*, 20*b*, and 20*c* are housed inside the battery case 10. Also, the number of the electrode bodies 20 housed inside one battery case 10 is not particularly limited and may be one or two or more (plural). However, in the secondary battery 100 including the plurality of electrode bodies 20, a timing of gas generation is dispersed for each of the electrode bodies 20*a*, 20*b*, and 20*c*, and thus the internal pressure of the case can be gradually increased when an internal short circuit or the like occurs. Thus, the gas discharge valve 17 can be operated to discharge the gas before the internal pressure of the case rises to a very high region. Further, as shown in FIG. 2, the positive electrode current collecting unit 50 is disposed on one side (the left side in FIG. 2) of each of the electrode bodies 20 in the long side direction Y, and the negative electrode current collecting unit 60 is disposed on the other side (the right side in FIG. 2) in the long side direction Y. In addition, the electrode bodies 20*a*, 20*b*, and 20*c* are connected in parallel. However, the electrode bodies 20*a*, 20*b*, and 20*c* may be connected in series. Here, the electrode bodies 20 are housed inside the exterior body 12 of the battery case 10 in a state in which each is covered with an electrode body holder 29 (see FIG. 3) made of a resin sheet.

Figure 6:
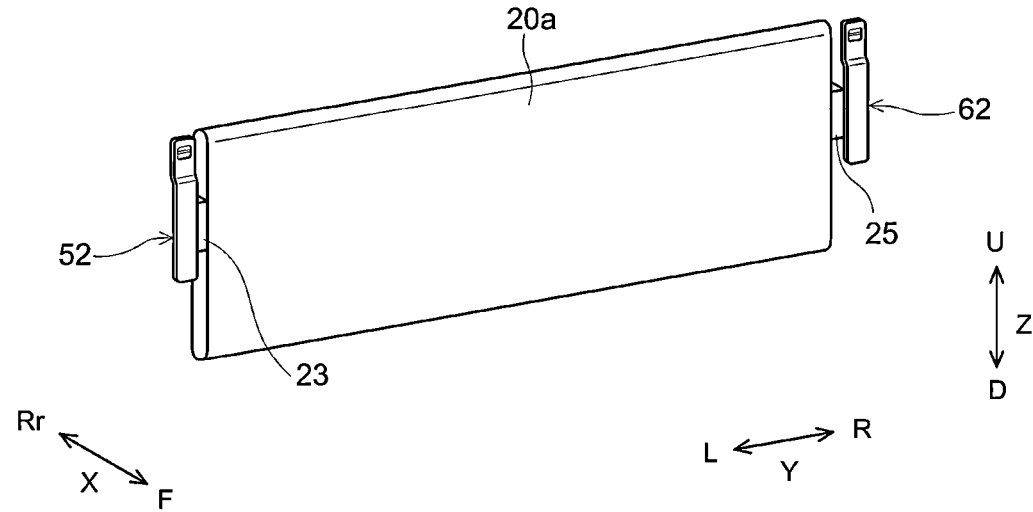
FIG. 6 is a perspective view schematically showing an electrode body to which a positive electrode second current collecting unit and a negative electrode second current collecting unit are attached.
Figure 7:
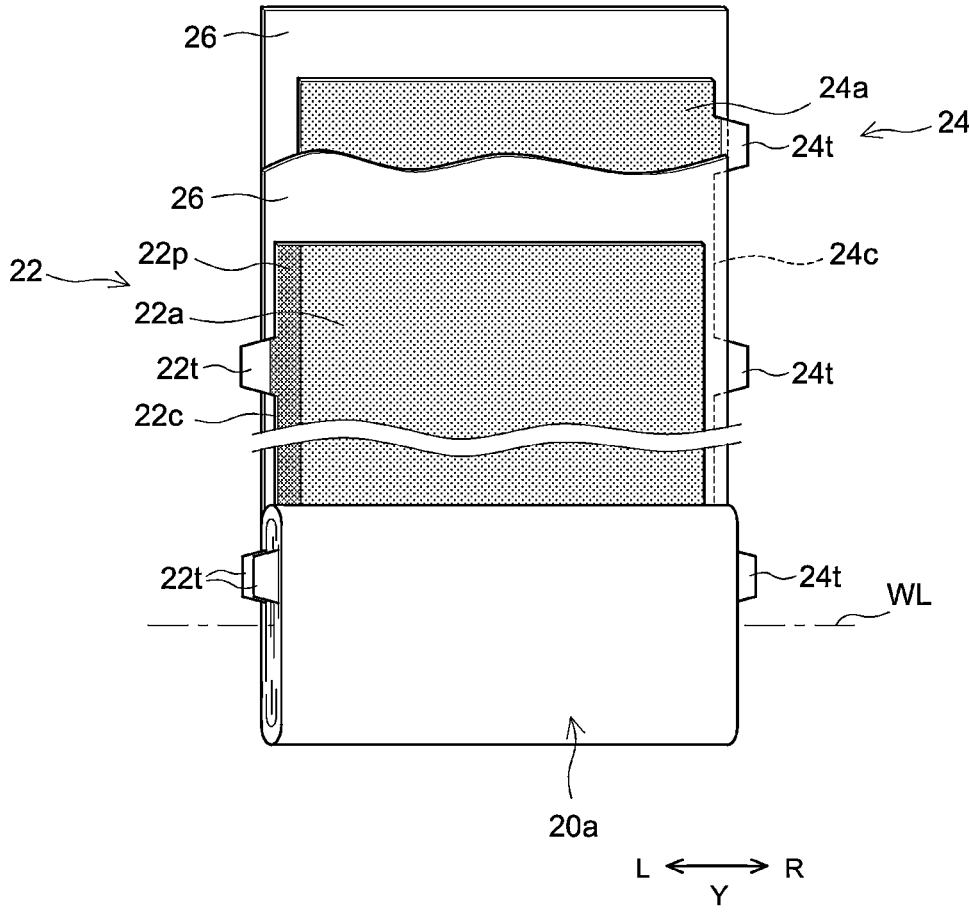
FIG. 7 is a schematic view showing a configuration of the electrode body.

FIG. 6 is a perspective view schematically showing the electrode body 20*a*. FIG. 7 is a schematic view showing a configuration of the electrode body 20*a*. Also, although the electrode body 20*a* will be described in detail below as an example, the electrode bodies 20*b* and 20*c* can also have the same configuration.

As shown in FIG. 7, the electrode body 20*a* has a positive electrode 22, a negative electrode 24, and a separator 26. Here, the electrode body 20*a* is a wound electrode body in which a band-shaped positive electrode 22 and a band-shaped negative electrode 24 are stacked with two band-shaped separators 26 interposed therebetween and wound around a winding axis WL. However, a structure of the electrode body does not limit the technique disclosed herein. For example, the electrode body may be a stacked electrode body formed by stacking a plurality of quadrangular (typically rectangular) positive electrodes and a plurality of quadrangular (typically rectangular) negative electrodes in an insulated state.

The electrode body 20*a* has a flat shape. The electrode body 20*a* is disposed inside the exterior body 12 in a direction in which the winding axis WL is substantially parallel to the long side direction Y. Specifically, as shown in FIG. 3, the electrode body 20*a* has a pair of curved portions (R portions) 20*r* that face the bottom wall 12*a* and the sealing plate 14 of the exterior body 12, and a flat portion 20*f* that connects the pair of curved portions 20*r* and faces the second side wall 12*b* of the exterior body 12. The flat portion 20*f* extends along the second side wall 12*b*.

As shown in FIG. 7, the positive electrode 22 has a positive electrode current collecting unit 22*c*, and a positive electrode active material layer 22*a* and a positive electrode protective layer 22*p* that are fixed on at least one surface of the positive electrode current collecting unit 22*c*. However, the positive electrode protective layer 22*p* is not essential and may be omitted in other embodiments. The positive electrode current collecting unit 22*c* has a band shape. The positive electrode current collecting unit 22*c* is made of a conductive metal such as aluminum, an aluminum alloy, nickel, or stainless steel. The positive electrode current collecting unit 22*c* here is a metal foil, specifically an aluminum foil.

A plurality of positive electrode tabs 22*t* are provided at one end portion (left end portion in FIG. 7) of the positive electrode current collecting unit 22*c* in the long side direction Y. The plurality of positive electrode tabs 22*t* are provided at intervals (intermittently) in a longitudinal direction of the band-shaped positive electrode 22. The plurality of positive electrode tabs 22*t* protrude outward from the separator 26 toward one side (left side in FIG. 7) of the winding axis WL in an axial direction thereof. Also, the positive electrode tabs 22*t* may be provided on the other side (right side in FIG. 7) of the winding axis WL in the axial direction, or may be provided on both sides of the winding axis WL in the axial direction. The positive electrode tabs 22*t* are a part of the positive electrode current collecting unit 22*c* and are made of a metal foil (aluminum foil). However, the positive electrode tabs 22*t* may be members different from the positive electrode current collecting unit 22*c*. A region at which the positive electrode current collecting unit 22*c* is exposed is formed in at least some of the positive electrode tabs 22*t* without forming the positive electrode active material layer 22*a* and the positive electrode protective layer 22*p*.

As shown in FIG. 4, the plurality of positive electrode tabs 22*t* are stacked at one end portion (left end portion in FIG. 4) of the winding axis WL in the axial direction to form a positive electrode tab group 23. Each of the plurality of positive electrode tabs 22*t* is bent so that outer ends thereof are aligned. Thus, housing capacity into the battery case 10 can be improved and the secondary battery 100 can be reduced in size. As shown in FIG. 2, the positive electrode tab group 23 is electrically connected to the positive electrode terminal 30 via the positive electrode current collecting unit 50. Specifically, the positive electrode tab group 23 and the positive electrode second current collecting unit 52 are connected at a connection portion J (see FIG. 4). In addition, the positive electrode second current collecting unit 52 is electrically connected to the positive electrode terminal 30 via the positive electrode first current collecting unit 51. Sizes of the plurality of positive electrode tabs 22*t* (lengths in the long side direction Y and widths orthogonal to the long side direction Y, see FIG. 7) can be appropriately adjusted in consideration of the state in which they are connected to the positive electrode current collecting unit 50, for example, depending on formation positions thereof. Here, the sizes of the plurality of positive electrode tabs 22*t* are different from each other so that the outer ends are aligned when bent.

As shown in FIG. 7, the positive electrode active material layer 22*a* is provided in a band shape in the longitudinal direction of the band-shaped positive electrode current collecting unit 22*c*. The positive electrode active material layer 22*a* contains a positive electrode active material (for example, a lithium transition metal composite oxide such as a lithium nickel cobalt manganese composite oxide) capable of reversibly storing and releasing charge carriers. When the total solid content of the positive electrode active material layer 22*a* is 100% by mass, the positive electrode active material may occupy approximately 80% by mass or more, typically 90% by mass or more, and for example, 95% by mass or more. The positive electrode active material layer 22*a* may contain optional components other than the positive electrode active material, for example, a conductive material, a binder, various additive components, and the like. For the conductive material, a carbon material such as acetylene black (AB) can be used. For the binder, for example, polyvinylidene fluoride (PVdF) or the like can be used.

As shown in FIG. 7, the positive electrode protective layer 22*p* is provided at a boundary portion between the positive electrode current collecting unit 22*c* and the positive electrode active material layer 22*a* in the long side direction Y. Here, the positive electrode protective layer 22*p* is provided at one end portion (left end portion in FIG. 7) of the winding axis WL of the positive electrode current collecting unit 22*c* in the axial direction. However, the positive electrode protective layer 22*p* may be provided at both end portions in the axial direction. The positive electrode protective layer 22*p* is provided in a band shape along the positive electrode active material layer 22*a*. The positive electrode protective layer 22*p* contains an inorganic filler (for example, alumina). When the total solid content of the positive electrode protective layer 22*p* is 100% by mass, the inorganic filler may occupy approximately 50% by mass or more, typically 70% by mass or more, and for example, 80% by mass or more. The positive electrode protective layer 22*p* may contain optional components other than the inorganic filler, for example, a conductive material, a binder, various additive components, and the like. The conductive material and the binder may be the same as those exemplified as being possible to be contained in the positive electrode active material layer 22*a*.

As shown in FIG. 7, the negative electrode 24 has a negative electrode current collecting unit 24*c*, and a negative electrode active material layer 24*a* fixed on at least one surface of the negative electrode current collecting unit 24*c*. The negative electrode current collecting unit 24*c* has a band shape. The negative electrode current collecting unit 24*c* is made of a conductive metal such as copper, a copper alloy, nickel, or stainless steel. Here, the negative electrode current collecting unit 24c is a metal foil, specifically a copper foil.

A plurality of negative electrode tabs 24t are provided at one end portion (right end portion in FIG. 7) of the winding axis WL of the negative electrode current collecting unit 24c in the axial direction. The plurality of negative electrode tabs 24t are provided at intervals (intermittently) in the longitudinal direction of the band-shaped negative electrode 24. Each of the plurality of negative electrode tabs 24t protrudes outward from the separator 26 toward one side (right side in FIG. 7) in the axial direction. However, the negative electrode tabs 24t may be provided at the other end portion in the axial direction (the left end in FIG. 7), or may be provided at both end portions in the axial direction. The negative electrode tabs 24t are a part of the negative electrode current collecting unit 24c and are made of a metal foil (copper foil). However, the negative electrode tabs 24t may be members different from the negative electrode current collecting unit 24c. A region at which the negative electrode current collecting unit 24c is exposed is formed in at least some of the negative electrode tabs 24t without forming the negative electrode active material layer 24a.

As shown in FIG. 4, the plurality of negative electrode tabs 24t are stacked at one end portion in the axial direction (right end portion in FIG. 4) to form a negative electrode tab group 25. The negative electrode tab group 25 is preferably provided at a position symmetrical with the positive electrode tab group 23 in the axial direction. In addition, each of the plurality of negative electrode tabs 24t is bent so that the outer ends are aligned. Thus, the housing capacity into the battery case 10 can be improved, and the secondary battery 100 can be reduced in size. As shown in FIG. 2, the negative electrode tab group 25 is electrically connected to the negative electrode terminal 40 via the negative electrode current collecting unit 60. Specifically, the negative electrode tab group 25 and the negative electrode second current collecting unit 62 are connected at the connection portion J (see FIG. 4). Further, the negative electrode second current collecting unit 62 is electrically connected to the negative electrode terminal 40 via the negative electrode first current collecting unit 61. Here, similarly to the plurality of positive electrode tabs 22t, sizes of the plurality of negative electrode tabs 24t are different from each other so that the outer ends when bent are aligned.

As shown in FIG. 7, the negative electrode active material layer 24a is provided in a band shape in the longitudinal direction of the band-shaped negative electrode current collecting unit 24c. The negative electrode active material layer 24a contains a negative electrode active material (for example, a carbon material such as graphite) capable of reversibly storing and releasing charge carriers. When the total solid content of the negative electrode active material layer 24a is 100% by mass, the negative electrode active material may occupy approximately 80% by mass or more, typically 90% by mass or more, and for example, 95% by mass or more. The negative electrode active material layer 24a may contain optional components other than the negative electrode active material, such as a binder, a dispersant, and various additive components. For the binder, rubbers such as styrene-butadiene rubber (SBR) can be used. For the dispersant, cell rolls such as carboxymethyl cellulose (CMC) can be used.

As shown in FIG. 7, the separator 26 is a member that insulates the positive electrode active material layer 22a of the positive electrode 22 and the negative electrode active material layer 24a of the negative electrode 24. As the separator 26, for example, a porous sheet made of a resin made of a polyolefin resin such as polyethylene (PE) or polypropylene (PP) is suitable. The separator 26 may have a base material portion made of a porous resin sheet, and a heat resistance layer (HRL) provided on at least one surface of the base material portion and containing an inorganic filler. For the inorganic filler, for example, alumina, boehmite, aluminum hydroxide, titania, and the like can be used.

The electrolytic solution may be the same as before, and there are no particular limitations. The electrolytic solution is, for example, a non-aqueous electrolytic solution containing a non-aqueous solvent and a supporting salt. The non-aqueous solvent contains, for example, carbonates such as ethylene carbonate, dimethyl carbonate, and ethyl methyl carbonate. The supporting salt is, for example, a fluorine-containing lithium salt such as $LiPF_6$. However, the electrolytic solution is in a solid state (solid electrolyte) and may be integrated with the electrode body 20.

As shown in FIG. 2, the positive electrode terminal 30 is inserted into the terminal insertion hole 18 formed at one end portion (left end portion in FIG. 2) of the sealing plate 14 in the long side direction Y. The positive electrode terminal 30 is preferably made of a metal, and more preferably made of, for example, aluminum or an aluminum alloy. On the other hand, the negative electrode terminal 40 is inserted into the terminal insertion hole 19 formed at the other end portion (right end portion in FIG. 2) of the sealing plate 14 in the long side direction Y. Also, the negative electrode terminal 40 is preferably made of a metal, and more preferably made of, for example, copper or a copper alloy. Here, these electrode terminals (the positive electrode terminal 30 and the negative electrode terminal 40) protrude from the same surface (specifically, the sealing plate 14) of the battery case 10. However, the positive electrode terminal 30 and the negative electrode terminal 40 may protrude from different surfaces of the battery case 10. Further, the electrode terminals (the positive electrode terminal 30 and the negative electrode terminal 40) inserted into the terminal insertion holes 18 and 19 are preferably fixed to the sealing plate 14 by caulking or the like.

As mentioned above, as shown in FIG. 2, the positive electrode terminal 30 is electrically connected to the positive electrode 22 (see FIG. 7) of each electrode body 20 via the positive electrode current collecting unit 50 (the positive electrode first current collecting unit 51 and the positive electrode second current collecting unit 52) inside the exterior body 12. The positive electrode terminal 30 is insulated from the sealing plate 14 by the positive electrode internal insulating member 70 and a gasket 90. Further, the positive electrode internal insulating member 70 includes a base portion 70a interposed between the positive electrode first current collecting unit 51 and the sealing plate 14, and a protruding portion 70b protruding from the base portion 70a toward the electrode body 20 side. In addition, the positive electrode terminal 30 exposed to the outside of the battery case 10 through the terminal insertion hole 18 is connected to the positive electrode external conductive member 32 outside the sealing plate 14. On the other hand, as shown in FIG. 2, the negative electrode terminal 40 is electrically connected to the negative electrode 24 (see FIG. 7) of each electrode body 20 via the negative electrode current collecting unit 60 (the negative electrode first current collecting unit 61 and the negative electrode second current collecting unit 62) inside the exterior body 12. The negative electrode terminal 40 is insulated from the sealing plate 14 by the negative electrode internal insulating member 80 and the gasket 90. Further, similarly to the positive electrode internal insulating member 70, the negative electrode internal insulating member 80 also includes a base portion 80*a* interposed between the negative electrode first current collecting unit 61 and the sealing plate 14, and a protruding portion 80*b* protruding from the base portion 80*a* toward the electrode body 20 side. In addition, the negative electrode terminal 40 exposed to the outside of the battery case 10 through the terminal insertion hole 19 is connected to the negative electrode external conductive member 42 outside the sealing plate 14. Also, the external insulating member 92 is interposed between the above-mentioned external conductive member (the positive electrode external conductive member 32 and the negative electrode external conductive member 42) and the outer surface 14*d* of the sealing plate 14. The external conductive members 32 and 42 can be insulated from the sealing plate 14 by the external insulating member 92.

Further, the protruding portions 70*b* and 80*b* of the above-mentioned internal insulating member (the positive electrode internal insulating member 70 and the negative electrode internal insulating member 80) are disposed between the sealing plate 14 and the electrode body 20. The protruding portions 70*b* and 80*b* of the internal insulating member restrict upward movement of the electrode body 20, and prevent the sealing plate 14 from coming into contact with the electrode body 20. Also, in the present embodiment, the bottom surface of the gas discharge valve 17 protrudes from an inner surface 14*c* of the sealing plate 14 toward the electrode body 20. For this reason, each dimension is preferably specified such that a distance from the bottom surface of the gas discharge valve 17 to the electrode body 20 in a direction perpendicular to the sealing plate 14 (the vertical direction Z) is larger than a thickness of the internal insulating member (here, the protruding portions 70*b* and 80*b*). Thus, it is possible to prevent the gas discharge valve 17 and the electrode body 20 from coming into contact with each other and prevent breakage of the gas discharge valve 17, conduction between the electrode body 20 and the sealing plate 14 via the gas discharge valve 17. Further, in the present embodiment, the sealing member 15*a* that closes the liquid injection hole 15 protrudes from the inner surface 14*c* of the sealing plate 14 toward the electrode body 20. In this case, the distance from the bottom surface of the gas discharge valve 17 to the electrode body 20 in the vertical direction Z is preferably larger than the distance from the sealing member 15*a* to the electrode body 20. Thus, breakage of the gas discharge valve 17 resulting from contact between the gas discharge valve 17 and the electrode body 20 can be more appropriately prevented. Further, from the viewpoint of preventing the conduction between the electrode body 20 and the sealing plate 14 via the sealing member 15*a*, the distance from the sealing member 15*a* to the electrode body 20 in the vertical direction Z is preferably larger than the thickness of the internal insulating member (the protruding portions 70*b* and 80*b*).

Design of Sealing Plate

In the secondary battery 100 according to the present embodiment, the sealing plate 14 is designed such that the gas discharge valve 17 operates stably. The design of the sealing plate 14 will be described below. FIG. 8 is an enlarged plan view of the sealing plate 14. Also, for convenience of explanation, FIG. 8 illustrates a state in which the positive electrode terminal 30 is inserted into the terminal insertion hole 18 on the positive electrode side and the negative electrode terminal 40 (see FIG. 2) is removed from the terminal insertion hole 19 on the negative electrode side.

First, when the internal pressure of the case of the secondary battery 100 including the flat rectangular sealing plate 14 rises significantly, the sealing plate 14 may be bent and deformed in a convex shape toward the outside of the battery case 10. In addition, when stress generated from the bending deformation of the sealing plate 14 is applied to the gas discharge valve 17, the gas discharge valve 17 is likely to operate (the thinned portion 17*a* is broken). In the secondary battery 100 according to the present embodiment, the sealing plate 14 satisfying the following expressions (1) to (3) is used so that the operational stability of the gas discharge valve 17 is improved due to the bending deformation of the sealing plate 14. Further, reference sign T1 in the following expressions is "thickness of the sealing plate 14" (see FIG. 3). Also, reference sign L1 is a "length of the short side 14*a* of the sealing plate 14," reference sign L2 is a "length of the long side 14*b* of the sealing plate 14," and reference sign L3 is a "length of the gas discharge valve 17 in the short side direction X of the sealing plate 14" (see FIG. 8). Each of the expressions (1) to (3) will be described below.

$$T1/L1 \leq 0.1 \tag{1}$$

$$L2/L1 \geq 6 \tag{2}$$

$$L3/L1 \geq 0.4 \tag{3}$$

Regarding Expression (1)

First, as shown in the above expression (1), the sealing plate 14 according to the present embodiment is designed such that a ratio (T1/L1) of the thickness T1 of the sealing plate 14 to the length L1 of the short side 14*a* of the sealing plate 14 is 0.1 or less. As a result, a strength of the sealing plate 14 is reduced, and thus the bending deformation of the sealing plate 14 is likely to occur when the internal pressure of the battery case 10 is increased. In addition, from the viewpoint of further facilitating occurrence of the bending deformation of the sealing plate 14, T1/L1 is preferably 0.09 or less, more preferably 0.08 or less. On the other hand, from the viewpoint of ensuring the strength of the sealing plate 14 to a certain level or more and preventing malfunction of the gas discharge valve 17, a lower limit of T1/L1 is preferably 0.01 or more, more preferably 0.05 or more, and even more preferably 0.07 or more. Also, a specific numerical value of the thickness T1 of the sealing plate 14 is not particularly limited as long as T1/L1 satisfies the range specified in the expression (1). For example, the thickness T1 of the sealing plate 14 can be 1 mm to 5 mm (preferably 2 mm to 4 mm, more preferably 2.5 mm to 3 mm, and for example 2.8 mm). In addition, "thickness T1 of the sealing plate 14" in the present specification indicates the thickness of the sealing plate 14 in a region (base portion) in which intentional unevenness or holes are not formed.

Further, the specific numerical value of the length L1 of the short side 14*a* of the sealing plate 14 is not particularly limited as long as the above expressions (1) to (3) are satisfied. For example, the length L1 of the short side 14*a* of the sealing plate 14 can be about 20 mm to 60 mm. Also, in the present specification, for convenience of explanation, the secondary battery 100 in which the length L1 of the short side 14*a* of the sealing plate 14 is 30 mm or more among the secondary batteries 100 having the above dimensions is referred to as a "large secondary battery". In such a large secondary battery, since the capacity of the battery case 10 is large, the internal pressure of the case does not easily rise, but since the volume of the electrode body 20 is large, a large amount of gas may be rapidly generated. It is difficult to design the thickness of the thinned portion 17*a* and a depth of the breakable groove 17*d* in consideration of the characteristics of such a large secondary battery such that the gas discharge valve 17 operates before the internal pressure of the case rises to a very high region. However, according to the present embodiment, since the sealing plate 14 may be designed from the viewpoint of easiness of the bending deformation of the sealing plate 14, the operational stability of the gas discharge valve 17 in a large secondary battery can be secured relatively easily. For this reason, the technique disclosed herein is appropriately applied to a large secondary battery having a short side length of 30 mm to 50 mm (more preferably 35 mm to 45 mm, and for example, 40 mm) of the sealing plate.

Regarding Expression (2)

Next, as shown in the above expression (2), the sealing plate 14 according to the present embodiment is designed such that a ratio (L2/L1) of the length L2 of the long side 14*b* of the sealing plate 14 to the length L1 of the short side 14*a* of the sealing plate 14 is 6 or more. By using the sealing plate 14 having a large aspect ratio (L2/L1) in this way, a bending moment near the center of the sealing plate 14 when the internal pressure of the case rises increases, and thus the sealing plate 14 is more likely to be bent and deformed. Further, from the viewpoint of further facilitating the bending deformation of the sealing plate 14, L2/L1 is preferably 6.5 or more, more preferably 7 or more, and particularly preferably 7.5 or more. On the other hand, from the viewpoint of preventing the bending deformation of the sealing plate 14 when the internal pressure of the case is relatively low, L2/L1 is preferably 12 or less, more preferably 11 or less, further preferably 10 or less, and particularly preferably 9 or less. Also, the specific numerical value of the length L2 of the long side 14*b* of the sealing plate 14 is not particularly limited as long as the above L2/L1 satisfies the expression (2). For example, the length L2 of the long side 14*b* of the sealing plate 14 can be 120 mm to 600 mm (preferably 250 mm to 500 mm, more preferably 250 mm to 400 mm, and for example, about 300 mm).

Regarding Expression (3)

In addition, in the secondary battery 100 according to the present embodiment, as shown in the above expression (3), the sealing plate 14 and the gas discharge valve 17 are designed such that a ratio (L3/L1) of the length L3 of the gas discharge valve 17 in the short side direction X of the sealing plate 14 to the length L1 of the short side 14*a* of the sealing plate 14 is 0.4 or more. In this way, by forming the gas discharge valve 17 having a size equal to or larger than a certain value with respect to the short side 14*a* of the sealing plate 14, the gas discharge valve 17 easily operates (the thinned portion 17*a* is broken) when the sealing plate 14 is bent and deformed. Further, from the viewpoint of making the gas discharge valve 17 easier to operate at the time of the bending deformation of the sealing plate 14, L3/L1 is preferably 0.45 or more, and more preferably 0.5 or more. On the other hand, from the viewpoint of preventing malfunction of the gas discharge valve 17, an upper limit of L3/L1 is preferably 0.8 or less, more preferably 0.7 or less, and particularly preferably 0.6 or less. Also, as long as the above expression (3) is satisfied, a specific numerical value of the length L3 of the gas discharge valve 17 in the short side direction X is not particularly limited. For example, the length L3 of the gas discharge valve 17 in the short side direction X can be 10 mm to 35 mm (preferably 15 mm to 30 mm, and more preferably 15 mm to 25 mm).

Figure 9:
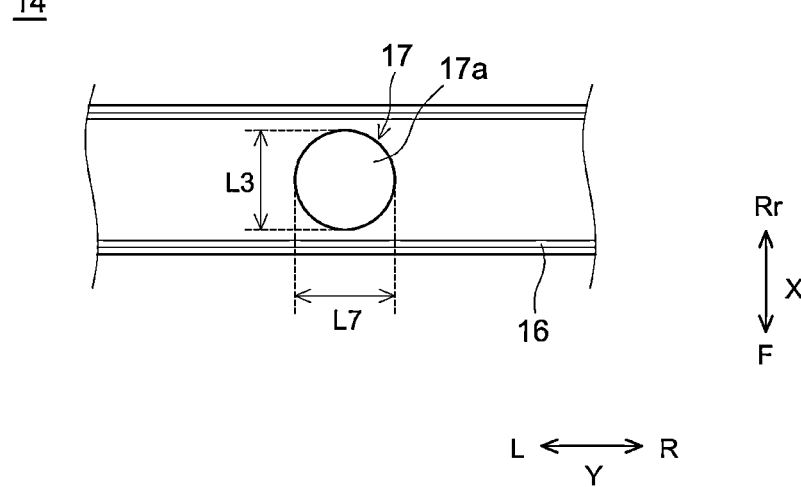
FIG. 9 is a plan view schematically showing a sealing plate of a secondary battery according to another embodiment.
Figure 10:
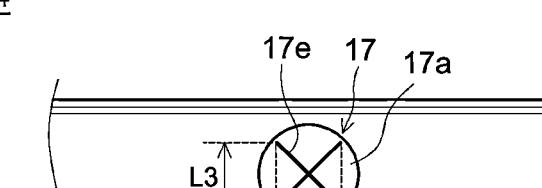
FIG. 10 is a plan view schematically showing a sealing plate of a secondary battery according to another embodiment.
Figure 10:
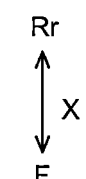
Figure 10:
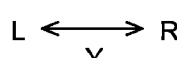
Figure 11:
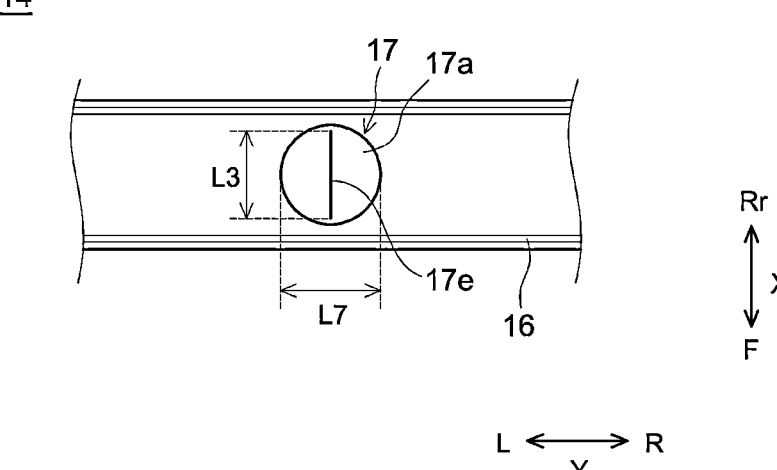
FIG. 11 is a plan view schematically showing a sealing plate of a secondary battery according to another embodiment.

Also, "length of the gas discharge valve" in the present specification indicates a length of a region (planned opening region) that may be opened when the internal pressure of the battery case 10 rises significantly. Specifically, as in the present embodiment, in a case in which the annular breakable groove 17*d* is formed, a diameter of the breakable groove 17*d* in the short side direction X is regarded as "length L3 of the gas discharge valve in the short side direction," and a diameter of the breakable groove 17*d* in the long side direction Y is regarded as a "length L7 of the gas discharge valve in the long side direction". On the other hand, as in another embodiment (see FIG. 9) that will be described later, in a case in which the breakable groove is not formed and a flat thinned portion 17*a* is formed on the entire bottom surface, a diameter of the thinned portion 17*a* in the short side direction X is regarded as "length L3 of the gas discharge valve in the short side direction," and a diameter of the thinned portion 17*a* in the long side direction Y is regarded as "length L7 of the gas discharge valve in the long side direction". Also, as shown in FIG. 10, in a case in which two linear breakable grooves 17*e* are formed to intersect with each other, a distance from a start point to an end point of the breakable groove 17*e* in the short side direction X is regarded as "length L3 of the gas discharge valve in the short side direction," and a distance from the start point to the end point of the breakable groove 17*e* in the long side direction Y is regarded as "length L7 of the gas discharge valve in the long side direction". Further, as shown in FIG. 11, in a case in which one linear breakable groove 17*e* extending in the short side direction X is formed, a length of the linear breakable groove 17*e* is regarded as "length L3 of the gas discharge valve in the short side direction," and the diameter of the thinned portion 17*a* in the long side direction Y is regarded as "length L7 of the gas discharge valve in the long side direction."

As described above, in the secondary battery 100 according to the present embodiment, the sealing plate 14 is designed to satisfy the above expressions (1) and (2) from the viewpoint of easily bending and deforming the sealing plate 14 when the internal pressure of the case reaches a desired pressure. In addition, dimensions of the sealing plate 14 and the gas discharge valve 17 are designed to satisfy the above expression (3) from the viewpoint of breaking the thinned portion 17*a* due to the stress when the sealing plate 14 is bent and deformed. Accordingly, in the secondary battery 100 according to the present embodiment, when the internal pressure of the case rises to a desired pressure, the sealing plate 14 is easily bent and deformed, and the gas discharge valve 17 can be stably operated (opened) by the bending deformation. That is, according to the present embodiment, it is possible to construct the secondary battery 100 having excellent safety in which the gas discharge valve 17 operates stably.

Regarding Other Configurations

Further, the secondary battery 100 according to the present embodiment has various configurations that can improve the operational stability of the gas discharge valve 17. Such a configuration will be described below. The configurations described below are not essential configurations of the secondary battery disclosed herein and can be appropriately changed as needed. In other words, the secondary battery disclosed herein may not have the configurations described below as long as a sealing plate and a gas discharge valve are designed to satisfy the above expressions (1) to (3).

Formation of Heat Insulating Groove

In general, since a planned opening region (a residual portion, a thinned portion, or the like of a breakable groove) of a gas discharge valve is very thin, it is easily affected by a decrease in strength due to thermal fatigue. For this reason, when heat at the time of welding between the exterior body 12 and the sealing plate 14 is transferred to the gas discharge valve 17, malfunction of the gas discharge valve 17 is likely to occur due to thermal deterioration in the planned opening region. On the other hand, in the present embodiment, a heat insulating groove 16 extending in the long side direction Y of the sealing plate 14 is formed between the long side 14b of the sealing plate 14 and the gas discharge valve 17 (see FIG. 8). This makes it possible to appropriately prevent the gas discharge valve 17 from malfunctioning due to the thermal deterioration in the planned opening region. Further, the sealing plate 14 in which the heat insulating groove 16 is formed tends to have a reduced strength against an increase in the internal pressure of the case. That is, the heat insulating groove 16 is also appropriate from the viewpoint of facilitating the bending deformation of the sealing plate 14.

Also, from the viewpoint of preventing unnecessary reduction in strength of the sealing plate 14 and appropriately preventing thermal deterioration of the gas discharge valve 17, a width of the heat insulating groove 16 (a length in the short side direction X) is preferably 0.2 mm to 1.0 mm, and more preferably 0.3 mm to 0.6 mm. Further, the depth of the heat insulating groove 16 is preferably appropriately set in consideration of the strength and heat insulating property of the sealing plate 14. For example, the depth of the heat insulating groove 16 is preferably 0.2 mm to 1.0 mm, and more preferably 0.4 mm to 0.6 mm.

Position of Terminal Insertion Hole

As described above, in the present embodiment, the terminal insertion holes 18 and 19 are formed at both end portions of the sealing plate 14 in the long side direction Y. In this case, a ratio (L4/L1) of the shortest distance L4 from the gas discharge valve 17 to the terminal insertion holes 18 and 19 in the long side direction Y with respect to the length L1 of the short side 14a of the sealing plate 14 preferably satisfies the following expression (4). Since the electrode terminals (the positive electrode terminal 30 and the negative electrode terminal 40) and the like are attached to the terminal insertion holes 18 and 19, bending deformation tends to be less likely to occur in the peripheral region thereof. On the other hand, by setting L4/L1 to be equal to or higher a certain level as shown in the following expression (4), it is possible to prevent the bending deformation of the sealing plate 14 in the vicinity of the gas discharge valve 17 from being hindered by the electrode terminals or the like.

$$L4/L1 \geq 3 \tag{4}$$

Also, from the viewpoint of more preferably preventing hindrance of deformation in the vicinity of the gas discharge valve 17, L4/L1 is preferably 3.3 or more, and more preferably 3.5 or more. On the other hand, an upper limit of L4/L1 is not particularly limited, and may be 10 or less, 7 or less, or 5 or less. The above "shortest distance L4 from the gas discharge valve to the terminal insertion hole" indicates a distance from the terminal insertion hole formed near the gas discharge valve among the two terminal insertion holes formed in the sealing plate to the gas discharge valve. Further, as long as the following expression (4) is satisfied, a specific numerical value of the shortest distance L4 from the gas discharge valve 17 to the terminal insertion holes 18 and 19 is not particularly limited. For example, L4 can be 100 mm to 150 mm (preferably 110 mm to 130 mm).

Position of Liquid Injection Hole

As described above, the liquid injection hole 15 for injecting the electrolytic solution into the battery case 10 in the manufacturing process is formed in the sealing plate 14 in the present embodiment. Since the sealing member 15a is attached to the liquid injection hole 15, the bending deformation tends to be less likely to occur in a region around the sealing member 15a. For this reason, a position of the liquid injection hole 15 is preferably controlled such that a ratio (L5/L1) of a distance L5 from the gas discharge valve 17 to the liquid injection hole 15 in the long side direction Y with respect to the length L1 of the short side 14a of the sealing plate 14 satisfies the following expression (5). As a result, it is possible to prevent the bending deformation of the sealing plate 14 in the vicinity of the gas discharge valve 17 form being hindered in the sealing member 15a.

$$L5/L1 \geq 1 \tag{5}$$

Also, from the viewpoint of more preferably preventing hindrance of deformation in the vicinity of the gas discharge valve 17, L5/L1 is preferably 1.5 or more. On the other hand, an upper limit of L5/L1 is not particularly limited and may be 2.5 or less or 2 or less. Further, as long as the expression (5) is satisfied, a specific value of the distance L5 from the gas discharge valve 17 to the liquid injection hole 15 is not particularly limited. For example, L5 can be 40 mm to 80 mm (preferably 50 mm to 70 mm).

Position of External Insulating Member

As shown in FIG. 2, in the present embodiment, the external insulating member 92 is interposed between the outer surface 14d of the sealing plate 14 and the external conductive member (the positive electrode external conductive member 32 and the negative electrode external conductive member 42). Even in a region around the external insulating member 92, the bending deformation of the sealing plate 14 may be hindered. For this reason, a position of the external insulating member 92 is preferably controlled such that a ratio (L6/L1) of the shortest distance L6 from the gas discharge valve 17 to the external insulating member 92 in the long side direction Y to the length L1 of the short side 14a of the sealing plate 14 satisfies the following expression (6). As a result, it is possible to prevent the bending deformation of the sealing plate 14 in the region around the gas discharge valve 17 from being hindered in the external insulating member 92.

$$L6/L1 \geq 2 \tag{6}$$

Further, from the viewpoint of more appropriately preventing hindrance of deformation in the vicinity of the gas discharge valve 17, L6/L1 is preferably 2.5 or more. On the other hand, an upper limit of L6/L1 is not particularly limited, and may be 4 or less, or 3.5 or less. In addition, in the present specification, "shortest distance L6 from the gas discharge valve to the external insulating member" indicates a distance from one external insulating member formed near the gas discharge valve among the pair of external insulating members attached to both end portions in the long side direction to the gas discharge valve. Also, as long as the above expression (6) is satisfied, a specific numerical value of the shortest distance L6 from the gas discharge valve 17 to the external insulating member 92 is not particularly limited. For example, L6 can be 80 mm to 120 mm (preferably 90 mm to 110 mm).

Thickness of Exterior Body

In a case in which the internal pressure of the flat quadrangular battery case 10 rises significantly, the flat surface (first side wall 12c) of the exterior body 12 may be deformed in addition to the sealing plate 14 described above. When the second side wall 12b of the exterior body 12 is deformed, the internal capacity of the battery case 10 increases and the bending deformation of the sealing plate 14 is delayed, and thus the operational stability of the gas discharge valve 17 may decrease. On the other hand, in the present embodiment, the exterior body 12 is configured such that the thickness of the first side wall 12c is larger than the thickness of the second side wall 12b. As a result, since the increase in the case capacity due to the deformation of the first side wall 12c is inhibited, the bending deformation of the sealing plate 14 can stably occur.

Further, from the viewpoint of surely bending and deforming the sealing plate 14 when the internal pressure of the case increases, a ratio of the thickness of the first side wall 12c to the thickness of the second side wall 12b is preferably 1.3 or more, and more preferably 1.5 or more. A specific thickness of the first side wall 12c is preferably 0.8 mm to 1.5 mm, and more preferably 1 mm to 1.2 mm. On the other hand, a specific thickness of the second side wall 12b is preferably 0.6 mm to 1.0 mm.

Depth of Welded Portion

Also, as described above, in the present embodiment, the battery case 10 is constructed by forming the welded portion M straddling between the upper surface 12d of the exterior body 12 and the outer surface 14d of the sealing plate 14 (see FIG. 3). Here, a depth of the welded portion M2 straddling between the long side 14b of the sealing plate 14 and the second side wall 12b is preferably deeper than a depth of the welded portion M1 straddling between the short side 14a of the sealing plate 14 and the first side wall 12c. As a result, it is possible to prevent a problem that the welded portion M2 on the long side 14b of the sealing plate 14 is peeled off and thus an appropriate bending moment is not generated near the central portion of the sealing plate 14 in the short side direction X.

Other Embodiments

The embodiment of the secondary battery disclosed herein has been described above. Also, the secondary battery disclosed herein is not limited to the above-described embodiment and includes various embodiments. Other embodiments of the secondary battery disclosed herein will be described below.

Shape of Breakable Groove

For example, the gas discharge valve is not limited to the above-mentioned structure, and various structures can be adopted without particular limitation. As shown in FIG. 9, the gas discharge valve 17 may not have a breakable groove 17d (see FIG. 8) and may have a flat thinned portion 17a formed over the entire bottom surface of a recessed portion. In the secondary battery disclosed herein, since the stress due to the bending deformation of the sealing plate is applied to the gas discharge valve, even the gas discharge valve 17 having no breakable groove as described above can be operated stably. Further, when the breakable groove is formed in the gas discharge valve, a shape of the breakable groove in a plan view is not particularly limited. For example, as shown in FIGS. 10 and 11, the shape of the breakable groove 17e in a plan view may be linear. In a case in which such a linear breakable groove 17e is formed, the gas discharge valve 17 can also be stably operated by the bending deformation of the sealing plate 14 when the sealing plate 14 is formed to satisfy the above expressions (1) to (3).

Shape of Gas Discharge Valve

Further, in each of the above-described embodiments, the gas discharge valve 17 having a substantially circular shape in a plan view is formed. However, the shape of the gas discharge valve in a plan view is not particularly limited, and various shapes can be adopted. For example, the shape of the gas discharge valve in a plan view may be elliptical or square (for example, quadrangle, pentagon, etc.). However, when the gas discharge valve 17 having a different long side and short side, such as an ellipse or a rectangle, is formed, it is preferable that the ratio (L3/L7) of the length L3 of the gas discharge valve 17 in the short side direction X to the length L7 of the gas discharge valve 17 in the long side direction Y satisfy the following expression (7). As a result, the gas discharge valve 17 can be stably operated when the sealing plate 14 is bent and deformed. Also, from the viewpoint of further improving the operational stability of the gas discharge valve 17, an upper limit of L3/L7 is preferably 1.5 or less, and more preferably 1.2 or less.

$$0.8 \leq L3/L7 \leq 2 \qquad (7)$$

Configuration of Sealing Plate

Further, the sealing plate 14 according to the above-described embodiment is provided with the terminal insertion holes 18 and 19 and the liquid injection hole 15 in addition to the gas discharge valve 17. However, the terminal insertion holes 18 and 19 and the liquid injection hole 15 do not have to be formed in the sealing plate 14. For example, among wall surfaces constituting a battery case, one wall surface (a bottom wall, a first side wall, or a second side wall) other than the sealing plate may be provided with a terminal insertion hole or a liquid injection hole.

The embodiments of the technique disclosed herein have been described above. However, the above description is merely an example and does not limit the scope of claims. The technique described in the claims includes various modifications and changes of the specific examples illustrated in the above description.

What is claimed is:

1. A secondary battery, comprising:
an electrode body including a positive electrode and a negative electrode; and
a battery case configured to house the electrode body, wherein
the battery case includes
an exterior body that is a flat quadrangular container of which one surface side forms an opening portion,
a flat rectangular sealing plate configured to close the opening portion of the exterior body, the sealing plate includes short sides extending along a short side direction of the sealing plate, and long sides longer than the short side and extending along a long side direction, wherein the sealing plate is fitted into the opening portion of the exterior body, and a welded portion is formed to straddle between an upper surface of the exterior body forming an outer edge of the opening portion and an outer surface of the sealing plate, and
a gas discharge valve provided in the sealing plate, and
the exterior body includes
a pair of first side walls each joined to one of the short sides of the sealing plate, and
a pair of second side walls each joined to one of the long sides of the sealing plate,
a thickness of each of the pair of first side walls is larger than a thickness of each of the pair of second side walls,
the welded portion includes
a first welded portion straddling between a long side of the long sides of the sealing plate and a second side wall of the pair of second side walls joined to the long side of the sealing plate, and
a second welded portion straddling between a short side of the short sides of the sealing plate and a first side wall of the pair of first side walls joined to the short side of the sealing plate, a depth of the first welded portion is larger than a depth of the second welded portion, the gas discharge valve includes a central portion, a peripheral portion around the central portion, and an annular breakable groove at the peripheral portion and surrounding the central portion, a geometrical moment of inertia of the central portion is larger than a geometrical moment of inertia of the peripheral portion, and a thickness T1 of the sealing plate, a length L1 of a short side of the short sides of the sealing plate, a length L2 of a long side of the long sides of the sealing plate, and a length L3 of the gas discharge valve in the short side direction of the sealing plate satisfy the following expressions (1) to (3):

$$T1/L1 \leq 0.1 \tag{1}$$

$$L2/L1 \geq 6.5 \tag{2}$$

$$L3/L1 \geq 0.4 \tag{3}$$

2. The secondary battery according to claim 1, wherein the sealing plate is fitted into the opening portion of the exterior body, and a welded portion is formed to bridge between an upper surface of the exterior body forming an outer edge of the opening portion and an outer surface of the sealing plate.

3. The secondary battery according to claim 2, wherein a heat insulating groove extending in the long side direction of the sealing plate is formed between a long side of the long sides of the sealing plate and the gas discharge valve.

4. The secondary battery according to claim 1, wherein a plurality of the electrode bodies are housed inside the battery case.

5. The secondary battery according to claim 1, further comprising a pair of electrode terminals penetrating the sealing plate, wherein the sealing plate includes two terminal insertion holes into which the pair of electrode terminals is inserted, respectively, and the length L1 of the short side of the sealing plate and the shortest distance L4 from the gas discharge valve to the terminal insertion holes in the long side direction of the sealing plate satisfy the following expression (4):

$$L4/L1 \geq 3 \tag{4}$$

6. The secondary battery according to claim 1, wherein the sealing plate includes a liquid injection hole communicating with an internal space of the exterior body, the liquid injection hole being sealed by a sealing member, and the length L1 of the short side of the sealing plate and a distance L5 from the gas discharge valve to the liquid injection hole in the long side direction of the sealing plate satisfy the following expression (5):

$$L5/L1 \geq 1 \tag{5}$$

7. The secondary battery according to claim 1, further comprising:

a pair of electrode terminals penetrating the sealing plate;

an external conductive member connected to the electrode terminals outside the sealing plate; and an external insulating member interposed between an outer surface of the sealing plate and the external conductive member, wherein the length L1 of the short side of the sealing plate and a shortest distance L6 from the gas discharge valve to the external insulating member in the long side direction of the sealing plate satisfy the following expression (6):

$$L6/L1 \geq 2 \tag{6}$$

8. The secondary battery according to claim 1, wherein the length L3 of the gas discharge valve in the short side direction of the sealing plate and a length L7 of the gas discharge valve in the long side direction of the sealing plate satisfy the following expression (7):

$$0.8 \leq L3/L7 \leq 2 \tag{7}$$

9. The secondary battery according to claim 1, wherein a bottom surface of the gas discharge valve protrudes from an inner surface of the sealing plate toward the electrode body, an internal insulating member is disposed between the sealing plate and the electrode body, and a distance from the bottom surface of the gas discharge valve to the electrode body in a direction perpendicular to the sealing plate is larger than a thickness of the internal insulating member.

10. The secondary battery according to claim 1, wherein a bottom surface of the gas discharge valve protrudes from an inner surface of the sealing plate toward the electrode body, the sealing plate includes a liquid injection hole communicating with an internal space of the exterior body, the liquid injection hole is sealed by a sealing member protruding from the inner surface of the sealing plate toward the electrode body, and in a direction perpendicular to the sealing plate, a distance from the bottom surface of the gas discharge valve to the electrode body is larger than a distance from the sealing member to the electrode body.

11. The secondary battery according to claim 1, wherein the length L1 of the short side of the sealing plate is 30 mm or more.

12. The secondary battery according to claim 8, wherein the length L3 of the gas discharge valve in the short side direction of the sealing plate and the length L7 of the gas discharge valve in the long side direction of the sealing plate satisfy the following expression (8):

$$0.8 \leq L3/L7 \leq 1.2 \tag{8}$$

* * * * *